United States Patent
Kim et al.

(10) Patent No.: US 10,002,401 B2
(45) Date of Patent: Jun. 19, 2018

(54) METHOD AND APPARATUS FOR EFFICIENT PROCESSING OF GRAPHICS COMMANDS

(71) Applicant: SAMSUNG ELECTRONICS CO., LTD., Suwon-si (KR)

(72) Inventors: Kyung-su Kim, Seoul (KR); Byung-joon Chang, Seoul (KR); Bong-hoon Park, Yongin-si (KR); Chan-min Park, Seoul (KR); Woo-ram Ann, Seongnam-si (KR); Tae-young Lee, Suwon-si (KR); Joo-young Jung, Seoul (KR); Cheul-hee Hahm, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days. days.

(21) Appl. No.: 15/198,155

(22) Filed: Jun. 30, 2016

(65) Prior Publication Data
US 2017/0132748 A1  May 11, 2017

Related U.S. Application Data

(60) Provisional application No. 62/253,891, filed on Nov. 11, 2015.

(30) Foreign Application Priority Data

Mar. 2, 2016 (KR) .......................... 10-2016-0025039

(51) Int. Cl.
*G06T 15/80* (2011.01)
*G06T 15/00* (2011.01)
*G06T 1/60* (2006.01)
*G06T 1/20* (2006.01)
*G09G 5/36* (2006.01)
*G06F 9/45* (2006.01)
*G06F 9/44* (2018.01)

(52) U.S. Cl.
CPC .................. *G06T 1/20* (2013.01); *G06F 8/30* (2013.01); *G06F 8/41* (2013.01); *G06T 1/60* (2013.01); *G06T 15/005* (2013.01); *G06T 15/80* (2013.01); *G09G 5/363* (2013.01)

(58) Field of Classification Search
None
See application file for complete search history.

(56) References Cited

U.S. PATENT DOCUMENTS

| | | | |
|---|---|---|---|
| 8,144,149 B2 * | 3/2012 | Jiao | G06T 15/80 345/419 |
| 2014/0043333 A1 | 2/2014 | Narayanan et al. | |
| 2015/0379680 A1 * | 12/2015 | Du | G06T 1/60 345/426 |
| 2016/0055667 A1 * | 2/2016 | Goel | G06T 15/83 345/522 |

* cited by examiner

*Primary Examiner* — Joni Richer
(74) *Attorney, Agent, or Firm* — Sughrue Mion, PLLC (57) ABSTRACT

A method of processing a graphics command may include: receiving the graphics command from an apparatus that executes an application; selecting at least one shader included in the graphics command to be processed by a graphics processor; creating a shader program using the selected at least one shader; searching for a shader program corresponding to the created shader program from among one or more previously compiled shader programs; and outputting a found shader program.

11 Claims, 10 Drawing Sheets

METHOD AND APPARATUS FOR EFFICIENT PROCESSING OF GRAPHICS COMMANDS

CROSS-REFERENCE TO RELATED APPLICATIONS

This application claims the benefit of provisional U.S. Patent Application No. 62/253,891, filed on Nov. 11, 2015, in the U.S. Patent and Trademark Office, and priority from Korean Patent Application No. 10-2016-0025039, filed on Mar. 2, 2016, in the Korean Intellectual Property Office, the disclosures of which are incorporated herein by reference in their entireties.

BACKGROUND

1. Field

Methods and apparatuses consistent with exemplary embodiments relate to processing graphics commands.

2. Description of Related Art

Graphics processing units (GPUs) may deliver brilliant graphics on mobile devices and TVs using graphics application programming interfaces (APIs) such as open graphics library (openGL) for embedded systems (ES), and open computing language (openCL) (supported by CUDA).

In order for a GPU to process a program, the program has to be written according to given rules of a standard API. Programs processed by the GPU, such as a vertex shader and a pixel shader, are compiled and linked to be used in the program.

As increasingly brilliant graphics have been delivered by applications used in mobile devices and TVs, the size of programs of the applications processed by GPUs has increased. As the program size increases, more time is required to compile and link vertex shaders and pixel shaders that constitute the programs. Further, a plurality of shaders has been repeatedly used to provide the same effect, particularly, in programs that are used in games.

SUMMARY

According to an aspect of an exemplary embodiment, there is provided a method of processing a graphics command, the method including: receiving the graphics command from an apparatus that executes an application; selecting at least one shader included in the graphics command to be processed by a graphics processor; creating a shader program using the selected at least one shader; searching for a shader program corresponding to the created shader program from among one or more previously compiled shader programs; and outputting a found shader program.

The selecting may include selecting a vertex shader and a pixel shader, each of the vertex shader and the pixel shader including a corresponding source code and a corresponding compile code.

The selecting may include selecting a vertex shader and a pixel shader, each of the vertex shader and the pixel shader including a corresponding source code and a corresponding compile code, and each of the vertex shader and the pixel shader may be received last.

The creating of the shader program may include creating the shader program using the vertex shader, the pixel shader, and uniform data.

The searching may include: generating a key comprising information about text of the at least one shader and a length of the text, text of uniform data and a length of the text, a compiler version, and a graphics processing unit (GPU) version; and searching for the shader program using the generated key.

The outputting may include outputting a binary of the found shader program.

According to an aspect of another exemplary embodiment, there is provided an apparatus for processing a graphics command, the apparatus including: a processor configured to receive the graphics command from an apparatus that executes an application, select at least one shader included in the graphics command to be processed by a graphics processor, create a shader program using the selected at least one shader, search for a shader program corresponding to the created shader program from among one or more previously compiled shader programs, and output a found shader program; and a cache configured to store the one or more previously compiled shader programs.

The processor may select a vertex shader and a pixel shader, each of the vertex shader and the pixel shader may include a corresponding compile code.

The processor may select a vertex shader and a pixel shader, each of the vertex shader and the pixel shader including a corresponding source code and a corresponding compile code, and each of the vertex shader and the pixel shader may be received last.

The processor may create the shader program using the vertex shader, the pixel shader, and uniform data.

The processor may generate a key using data including information about text of the at least one shader and a length of the text, text of uniform data and a length of the text, a compiler version, and a graphics processing unit (GPU) version and searches for the shader program using the generated key.

The cache may store information including a binary and a key corresponding to each of the one or more previously compiled shader programs.

The processor may not perform compiling in response to receiving a shader comprising a compile code.

According to an aspect of yet another exemplary embodiment, there is provided a graphics processing unit (GPU) including: a graphics driver configured to receive a graphics command from an apparatus that executes an application, select at least one shader included in the graphics command to be processed by a graphics processor, create a shader program using the selected at least one shader, search for a shader program corresponding to the created shader program from among previously compiled shader programs, and output a found shader program; and a cache configured to store the previously compiled shader programs.

According to an aspect of still another exemplary embodiment, there is provided a non-transitory computer-readable recording medium having embodied thereon a program, which when executed by a processor, causes the processor to execute a method including: receiving the graphics command from an apparatus that executes an application; selecting at least one shader included in the graphics command to be processed by a graphics processor; creating a shader program using the selected at least one shader; searching for a shader program corresponding to the created shader program from among one or more previously compiled shader programs; and outputting a found shader program.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Exemplary embodiments will now be described more fully with reference to the accompanying drawings to fully convey the scope of the inventive concept to one of ordinary skill in the art. The inventive concept may, however, be embodied in many different forms and should not be construed as being limited to exemplary embodiments set forth herein. Also, parts in the drawings unrelated to the detailed description are omitted to ensure clarity. Like reference numerals in the drawings denote like elements, and thus their description will not be repeated.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

As used herein, the term "and/or" includes any and all combinations of one or more of the associated listed items. Expressions such as "at least one of" when preceding a list of elements, modify the entire list of elements and do not modify the individual elements of the list.

Figure 1:
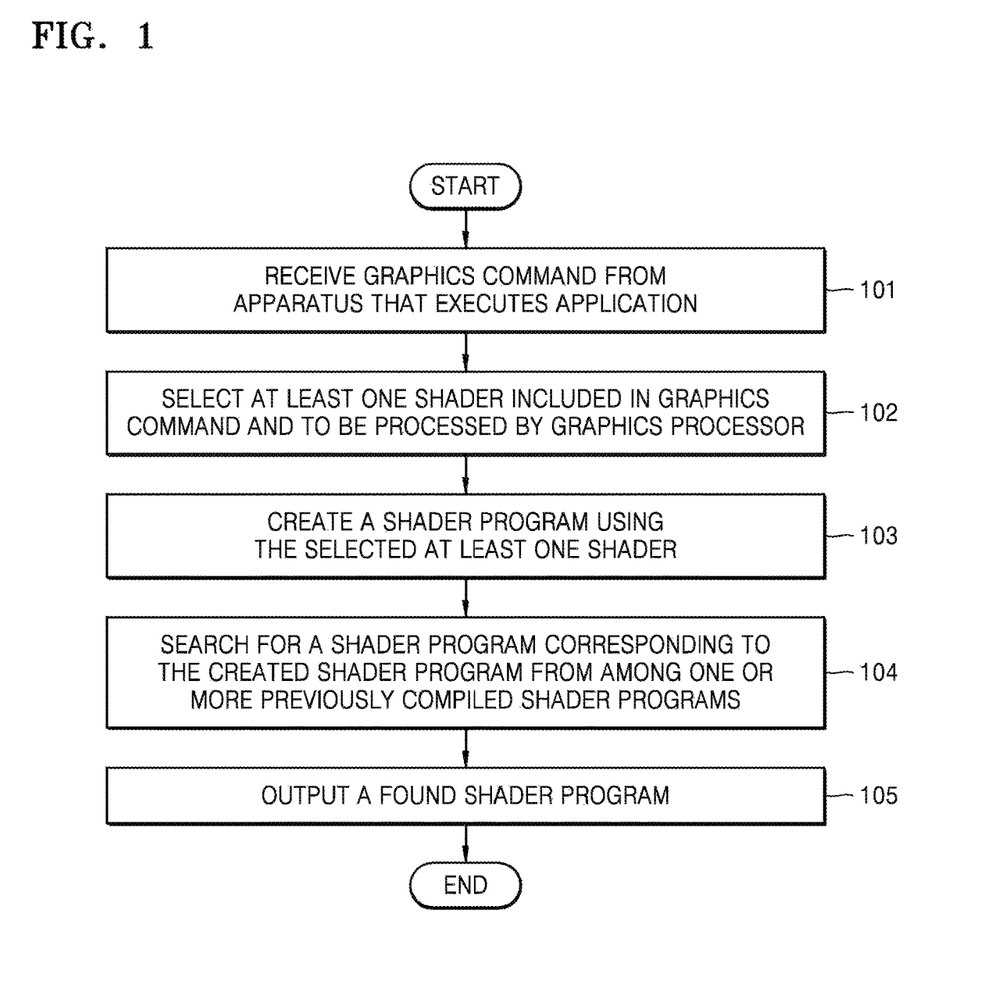
FIG. 1 is a flowchart of a method of processing a graphics command according to an exemplary embodiment.

FIG. 1 is a flowchart of a method of processing a graphics command according to an exemplary embodiment. In operation 101, when a request to process a graphics command in an application occurs, an apparatus for processing a graphics command (hereinafter, referred to as the graphics command processing apparatus) receives the graphics command from an apparatus that executes the application. A command that may be processed by a graphics processing unit (GPU) may be included in the graphics command. For example, a shader program-related application programming interface (API) may be included in the graphics command.

In operation 102, the graphics command processing apparatus may select at least one shader that is included in the graphics command received in operation 101 and is to be processed by a graphics processor. The at least one shader to be processed by the graphics processor may include, but is not limited to, a vertex shader and a pixel shader.

In operation 103, the graphics command processing apparatus may create a shader program by using the at least one shader selected in operation 102. The shader program is a unit or a type of program that may be processed by the GPU. The shader program may include, but is not limited to, the at least one shader selected in operation 102 and uniform data received by the graphics command processing apparatus.

In operation 104, the graphics command processing apparatus may search for and find a shader program that is the same as the shader program created in operation 103 from among one or more previously compiled shader programs. The graphics command processing apparatus may search for and find a shader program that is the same as the shader program created in operation 103 by using information about a source code (or a compile code) of each of the vertex shader and the pixel shader included in the shader program, the uniform data, a compiler version, and a GPU version. The graphics command processing apparatus may search for and find a shader program that is the same as the shader program created in operation 103 by using text of a shader source code and a length of the text, and text of the uniform data and a length of the text. The graphics command processing apparatus may generate a key by using information about text of the shader source code and a length of the text, text of the uniform data and a length of the text, a compiler version, and a GPU version. The graphics command processing apparatus may search for and find a key that is the same as the generated key. The key is unique data for identifying the shader program. In other words, a different key is generated for each shader program.

In operation 105, the graphics command processing apparatus may output the shader program found in operation 104. The graphics command processing apparatus may output the found shader program to a graphics driver or a graphics processor. A shader program manager may output the shader program found in operation 104 as a binary.

Operations of FIG. 1 may be stored as programs or instructions in a memory and may be performed by, but not limited to, a main processor, a GPU, a shader program manager, or a graphics driver.

Figure 2:
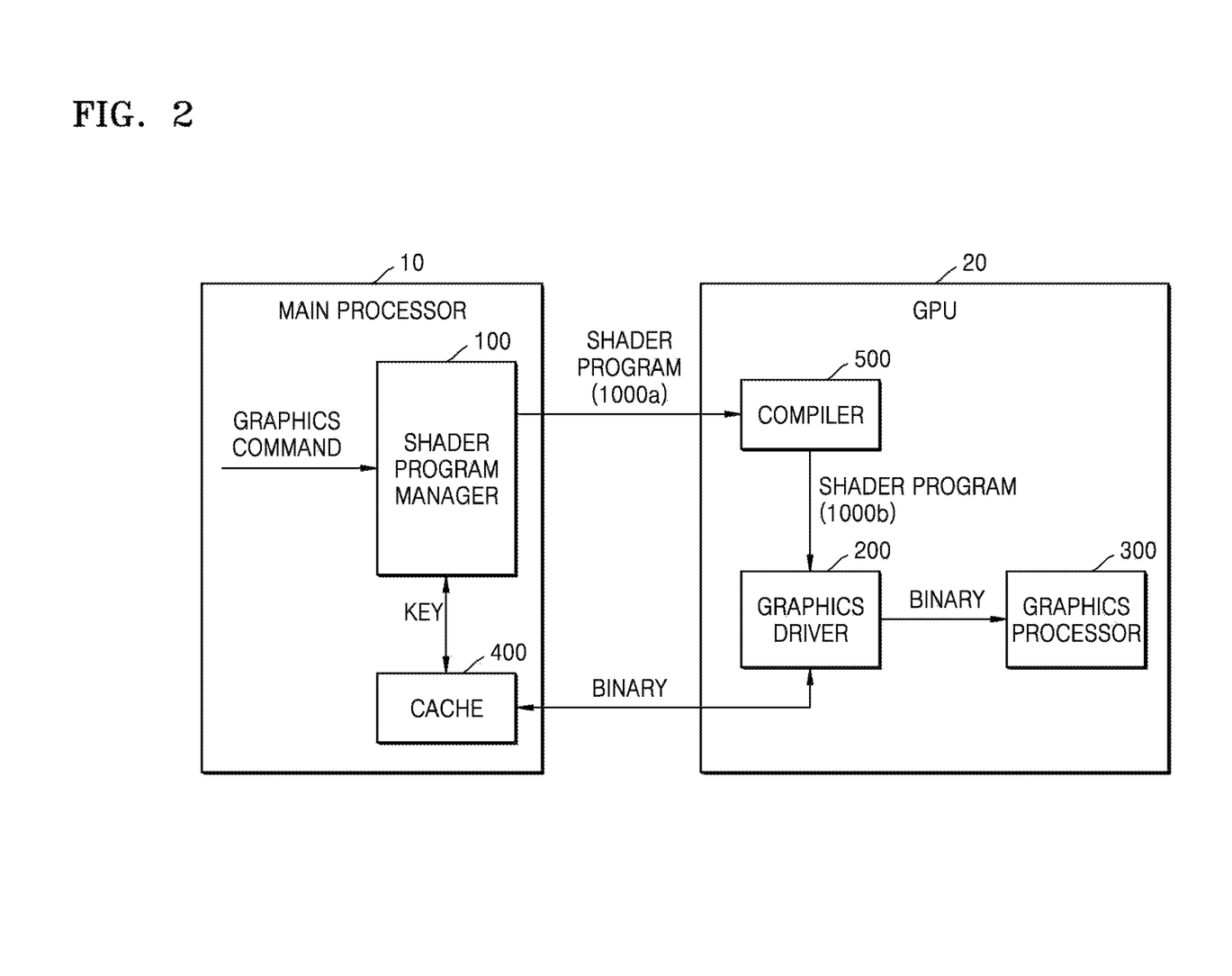
FIG. 2 is a block diagram for explaining a process performed by an apparatus for processing a graphics command (referred to as the graphics command processing apparatus) located outside a graphics processing unit (GPU) to process a graphics command, according to an exemplary embodiment.

FIG. 2 is a block diagram for explaining a process performed by a graphics command processing apparatus located outside a GPU 20 to process a graphics command according to an exemplary embodiment.

Referring to FIG. 2, the graphics command processing apparatus may include a main processor 10 or a shader program manager 100. The shader program manager 100 may be located outside the GPU 20.

The GPU 20 may include a graphics driver 200, a graphics processor 300, and a compiler 500.

The main processor 10 may include the shader program manager 100 and a cache 400.

One or more previously compiled shader programs may be stored in the cache 400. The shader programs may each be stored as a binary in the cache 400. A key that is generated by using information included in a shader program 1000a may be stored in the cache 400. The key may be generated by using information about, but not limited to, text of a shader source code and a length of the text, text of uniform data and a length of the text, a compiler version, and GPU version.

The shader program manager 100 may receive a graphics command. The shader program manager 100 may select at least one shader that is included in the received graphics command and is to be processed by a graphics processor 300. The shader program manager 100 may create a shader program by using the selected at least one shader. The shader program manager 100 may search for and find a shader program that is the same as the created shader program from among the one or more previously compiled shader programs, and may output the found shader program.

The shader program manager 100 may use a key to search for and find a shader program that is the same as the created shader program 1000a. In an exemplary embodiment, the shader program manager 100 may generate a key by using information included in the created shader program 1000a. Also, the key generated by the shader program manager 100 may be stored in the cache 400. When the key is stored in the cache 400, the shader program manager 100 may search for and find a shader program that is the same as the created shader program 1000a in the cache 400 by comparing a key of the created shader program 1000a with the key of the shader program stored in the cache 400.

When the shader program manager 100 finds a shader program that is the same as the created shader program 1000a, the shader program manager 100 may output the found shader program. The shader program manager 100 may output the found shader program to a graphics driver 200. The shader program manager 100 may output the found shader program as a binary. The binary is data that may be recognized by the graphics processor 300.

When the shader program manager 100 does not find a shader program that is the same as the created shader program 1000a, the shader program manager 100 may output the created shader program 1000a to the graphics driver 200. When the created shader program 1000a is output to the graphics driver 200, the graphics driver 200 may generate a binary by compiling the received shader program 1000a by using a compiler 500. The graphics driver 200 may output the generated binary to the graphics processor 300. The graphics driver 200 may store the generated binary in the cache 400. The shader program manager 100 may store the key of the shader program 1000a that has been used for the searching in the cache 400.

Figure 3:
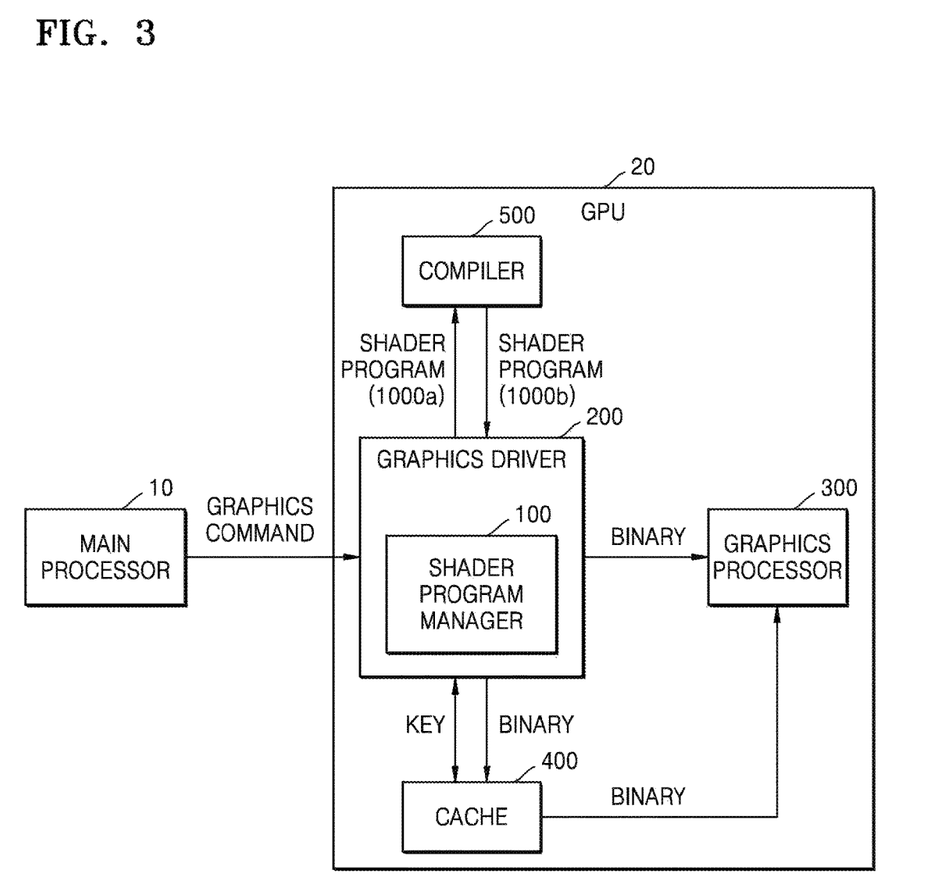
FIG. 3 is a block diagram for explaining a process performed by a graphics command processing apparatus located inside the GPU to process a graphics command, according to an exemplary embodiment.

FIG. 3 is a block diagram for explaining a process performed by a graphics command processing apparatus located inside the GPU 20 to process a graphics command according to an exemplary embodiment.

Referring to FIG. 3, the graphics command processing apparatus may include, but is not limited to, the graphics driver 200 or the shader program manager 100. The shader program manager 100 may be located inside the GPU 20.

The GPU 20 may include the graphics driver 200, the graphics processor 300, the cache 400, and the compiler 500.

One or more previously compiled shader programs may be stored in the cache 400. The shader programs may each be stored as a binary in the cache 400. A key generated by using information included in the shader program 1000a may be stored in the cache 400. The key may be generated by using information about, but not limited to, text of a shader source code and a length of the text, text of uniform data and a length of the text, a compiler version, and a GPU version.

The shader program manager 100 may receive a graphics command. The shader program manager 100 may select at least one shader that is included in the received graphics command and is to be processed by the graphics processor 300. The shader program manager 100 may create a shader program by using the selected at least one shader. The shader program manager 100 may search for and find a shader program that is the same as the created shader program from among the one or more previously compiled shader programs and may output the found shader program.

The shader program manager 100 may use a key to search for and find a shader program that is the same as the created shader program 1000a. In an exemplary embodiment, the shader program manager 100 may generate a key by using information included in the created shader program 1000a. Also, the key generated by the shader program manager 100 may be stored in the cache 400. When the key is stored in the cache 400, the shader program manager 100 may search for and find a shader program that is the same as the created shader program 1000a in the cache 400 by comparing a key of the created shader program 1000a with the key of the shader program stored in the cache 400.

When the shader program manager 100 finds a shader program that is the same as the created shader program 1000a, the shader program manager 100 may output the found shader program. The shader program manager 100 may output the found shader program to the graphics processor 300. The shader program manager 100 may output the found shader program as a binary.

When the shader program manager 100 does not find a shader program that is the same as the created shader program 1000a, the shader program manager 100 may output the created shader program 1000a to the compiler 500. The compiler 500 may generate a binary by compiling the received shader program 1000a. The graphics driver 200 may output the generated binary to the graphics processor 300. The generated binary may be stored in the cache 400. When the shader program manager 100 does not find a shader program that is the same as the created shader program 1000a, a key of the created shader program 1000a may be stored in the cache 400. However, the inventive concept is not limited thereto.

Figure 4:
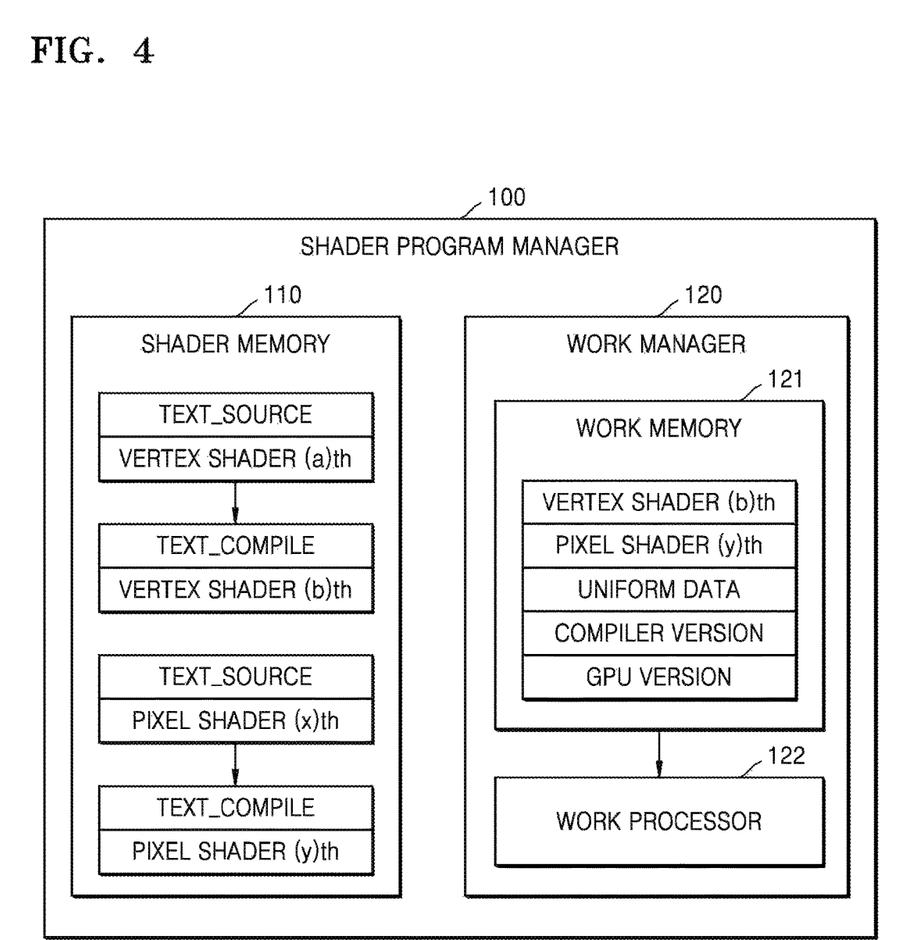
FIG. 4 is a block diagram of a shader program manager according to an exemplary embodiment.

FIG. 4 is a block diagram of the shader program manager 100 according to an exemplary embodiment.

Referring to FIG. 4, the shader program manager 100 according to an exemplary embodiment may include a shader memory 110 and a work manager 120.

A graphics command received by the shader program manager 100 may be stored in the shader memory 110. At least one shader included in the graphics command may be stored in the shader memory 110. The at least one shader stored in the shader memory 110 may include a vertex shader and a pixel shader.

In an exemplary embodiment, the vertex shader and the pixel shader each including a source API may be stored in the shader memory 110. The source API may include a source code. The source code of each of the vertex shader and the pixel shader including the source API may be stored in the shader memory 110. The source code of each of the vertex shader and the pixel shader may be stored as text. The source code of each of the vertex shader and the pixel shader may be independently stored in, but not limited to, a TEXT_source space of the shader memory 110.

The vertex shader and the pixel shader each including the source API and a compile API may be stored in the shader memory 110. The compile API may include a compile code. The compile code of each of the vertex shader and the pixel shader may be stored in the shader memory 110. The compile code of each of the vertex shader and the pixel shader may be stored as text. The compile code of each of the vertex shader and the pixel shader may be independently stored in a TEXT_compile space of the shader memory 110.

Alternatively, when one shader is received, the compile API may be processed later than the source API. The source code of each of the vertex shader and the pixel shader that is independently stored in the TEXT_source space of the shader memory 110 may be copied to and may be independently stored in, but not limited to, the TEXT_compile space of the shader memory 110.

When the shader program manager 100 sequentially receives at least one vertex shader and at least one pixel shader each including the source API, the shader program manager 100 may store the vertex shader and the pixel shader that are received later in the shader memory 110.

In an exemplary embodiment, irrespective of whether the source code is stored in the TEXT_source space of the shader memory 110, the shader program manager 100 may independently store the source code of each of the vertex shader and the pixel shader that are received later in the TEXT_source space of the shader memory 110. The shader program manager 100 may finally independently store the source code of each of the vertex shader and the pixel shader, which are received last from among the at least one vertex shader and the at least one pixel shader each including the source API, in the TEXT_source space of the shader memory 110.

When the shader program manager 100 sequentially receives at least one vertex shader and at least one pixel shader each including the source API and the compile API, the shader program manager 100 may store the vertex shader and the pixel shader that are received later in the shader memory 110.

In an exemplary embodiment, irrespective of whether the source code (or the compile code) is stored in the TEXT_compile space of the shader memory 110, the shader program manager 100 may independently store the source code (or the compile code) of each of the vertex shader and the pixel shader that are received later in the TEXT_compile space of the shader memory 110. When the shader program manager 100 independently stores the source code in the TEXT_compile space of the shader memory 110, the source code of each of the vertex shader and the pixel shader that are independently stored in the TEXT_source space of the shader memory 110 may be copied to and may be independently stored in the TEXT_compile space of the shader memory 110.

In an exemplary embodiment, computation may be omitted by deferring processing of a graphics command. In another exemplary embodiment, computation for creating a shader that is not to be used in a shader program may be omitted by deferring processing of a shader received to select the shader program. In another exemplary embodiment, the deferred shader may be a vertex shader and a pixel shader.

The work manager 120 may search for and find a shader program that is the same as the created shader program 1000a.

The work manager 120 may include a work memory 121 and a work processor 122.

Information used to search for and find a shader program may be stored in the work memory 121.

Information about a vertex shader, a pixel shader, and uniform data may be stored in the work memory 121. In an exemplary embodiment, information about text of a source code (or a compile code) of each of the vertex shader and the pixel shader and a length of the text, text of the uniform data and a length of the text, a compiler version and a GPU version may be stored in the work memory 121.

The work processor 122 may search for and find a shader program. The work processor 122 will now be explained with reference to FIG. 5.

Figure 5:
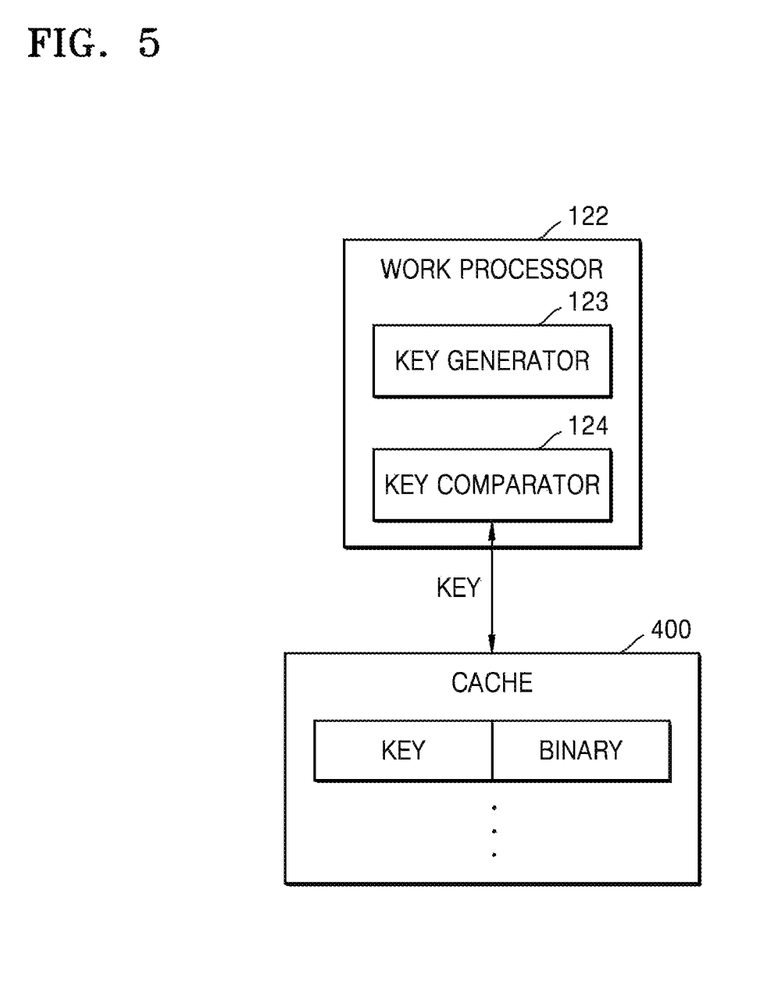
FIG. 5 is a block diagram for explaining a process performed by a work processor to search for and find a shader program, according to an exemplary embodiment.

FIG. 5 is a block diagram for explaining a process performed by the work processor 122 to search for and find a shader program according to an exemplary embodiment.

The work processor 122 may search for and find a shader program that is the same as the created shader program 1000a from among one or more previously compiled shader programs by using information stored in the work memory 121.

The work processor 122 may search for and find a shader program by using a key. When the work processor 122 searches for and finds a shader program by using a key, the work processor 122 may include a key generator 123 and a key comparator 124.

The key generator 123 may generate a key by using information used to search for and find a shader program and is stored in the work memory 121. For example, the key generator 123 may generate a key by using information about a source code (or a compile code) of each of a vertex shader and a pixel shader stored in the work memory 121 and a length of the text, text of uniform data and a length of the text, a compiler version, and a GPU version.

The key comparator 124 may compare the key generated by the key generator 123 with keys of the one or more previously compiled shader programs. The keys of the one or more previously compiled shader programs may be stored in the cache 400. When the keys are stored in the cache 400, the key comparator 124 may compare the key generated by the key generator 123 with the keys of the one or more previously compiled shader programs stored in the cache 400.

Figure 6:
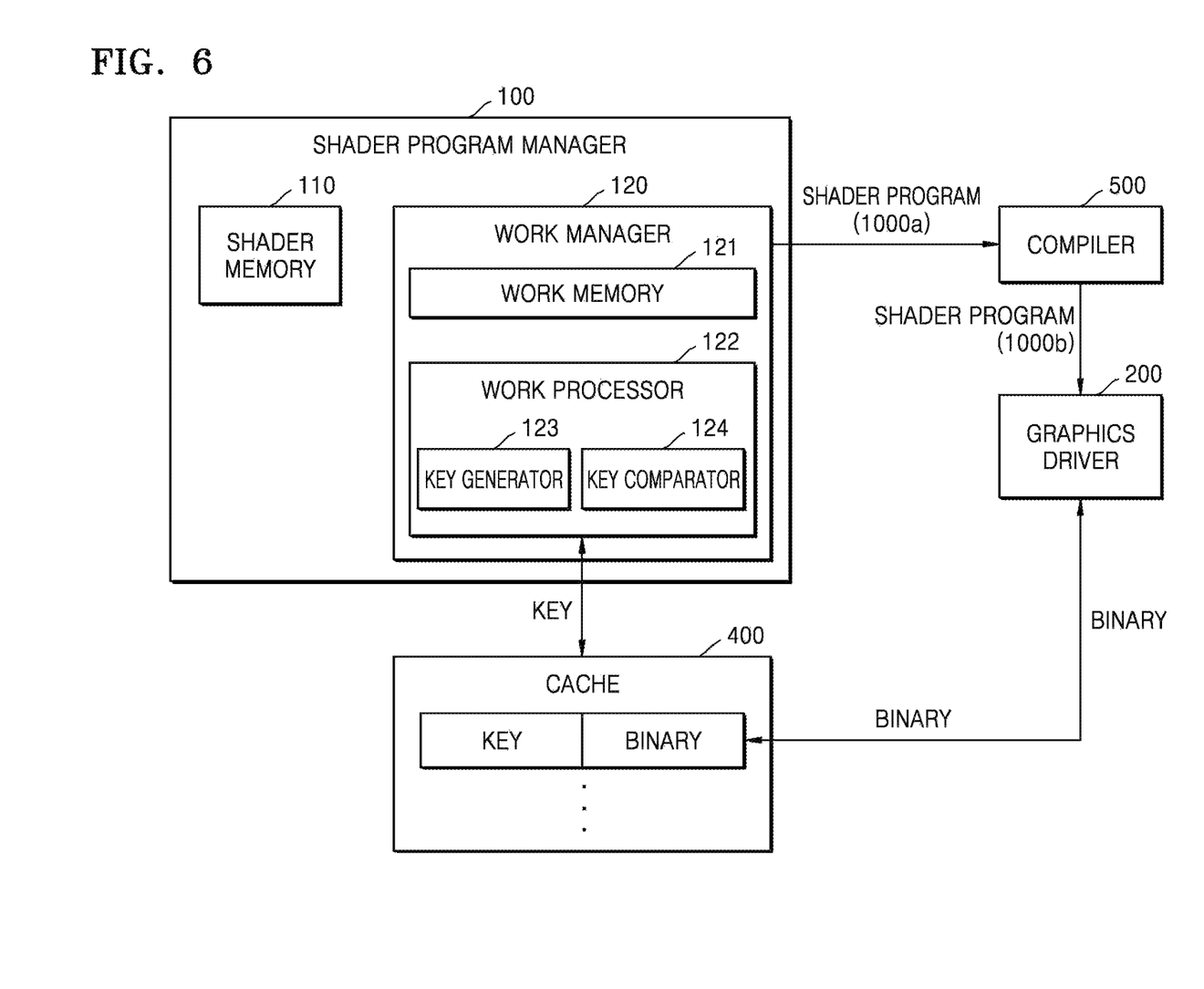
FIG. 6 is a block diagram for explaining a process performed by a graphics command processing apparatus to search for, find, and output a shader program, according to an exemplary embodiment.

FIG. 6 is a block diagram for explaining a process performed by a graphics command processing apparatus to search for, find, and output a shader program according to an exemplary embodiment.

Referring to FIG. 6, the graphics command processing apparatus according to an exemplary embodiment may include, but is not limited to, the shader program manager 100.

When the work processor 122 searches for and finds a compiled shader program that is the same as the created shader program 1000a, the shader program manager 100 may output the found shader program to the graphics driver 200. Alternatively, when the graphics command processing apparatus includes the graphics driver 200, the graphics driver 200 may output the found shader program to the graphics processor 300. The found shader program may be output as a binary.

When the work processor 122 does not find a compiled shader program that is the same as the created shader program 1000a, the shader program manager 100 may output the created shader program 1000a to the compiler 500, and the created shader program 1000a may be compiled by the compiler 500. Alternatively, when the graphics command processing apparatus includes the graphics driver 200, the graphics driver 200 may output the created shader program 1000a to the compiler 500, and the created shader program 1000a may be compiled by the compiler 500. A compiled shader program 1000b may be used in order for the work processor 122 to search for and find a shader program that is the same as the newly created shader program 1000a. When the work processor 122 does not find a compiled shader program that is the same as the created shader program 1000a, the compiled shader program 1000b may be stored in the cache 400. The compiled shader program 1000b may be stored as a binary in the cache 400.

When the work processor 122 finds a compiled shader program that is the same as the created shader program 1000a, the work processor 122 may search for and find a shader program by using a key.

When the work processor 122 does not find a compiled shader program having the same key as a key of the created shader program 1000a, the key of the created shader program 1000a may be stored in the cache 400. After the created shader program 1000a is compiled, the compiled shader program 1000b may be stored as a binary in the cache 400. After the binary is stored in the cache 400, the key of the shader program 1000a that is stored in the cache 400 may be connected to the binary.

Figure 7:
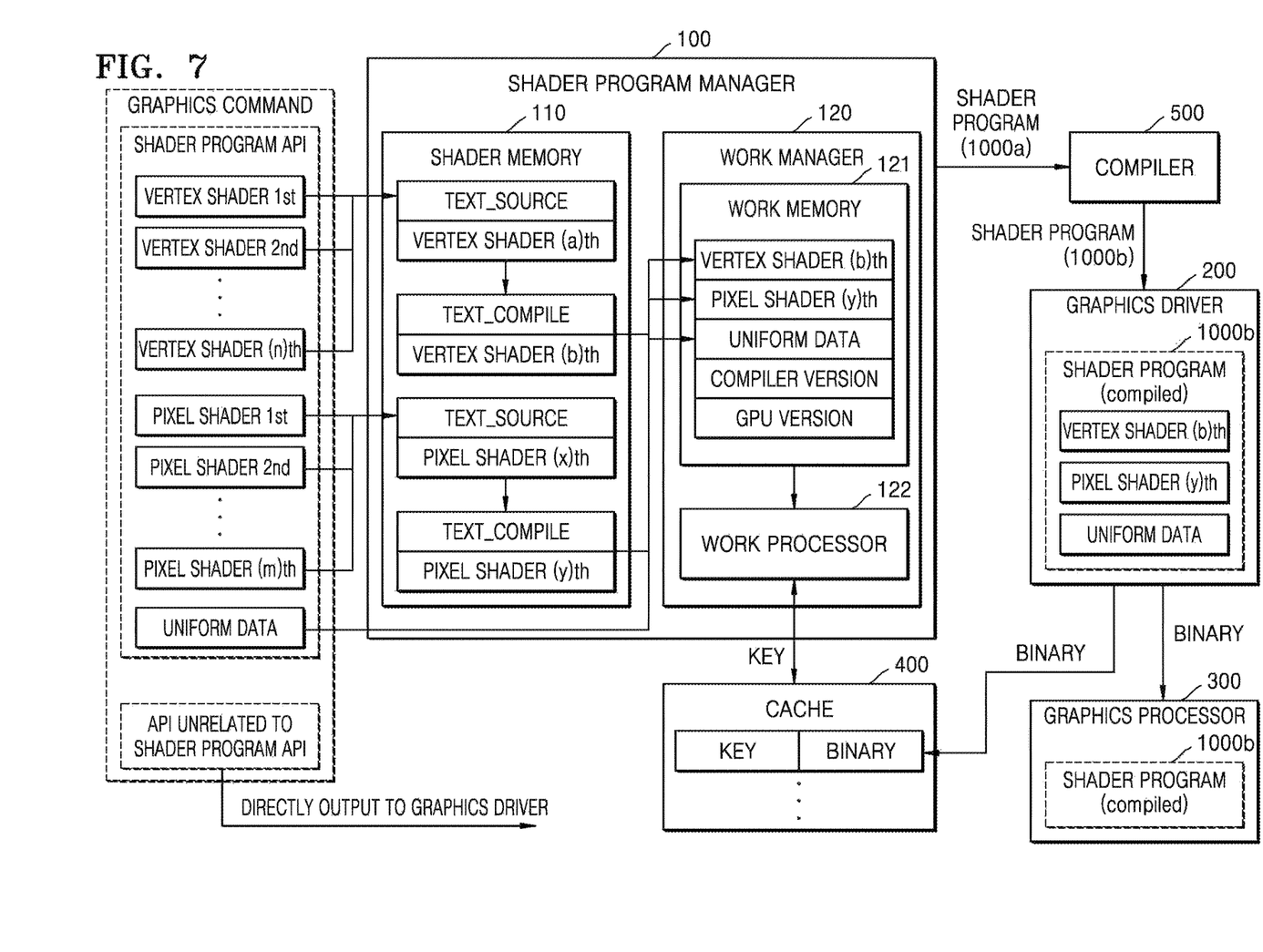
FIG. 7 is a block diagram for explaining a process performed by a graphics command processing apparatus to process data, according to an exemplary embodiment.

FIG. 7 is a block diagram for explaining a process performed by a graphics command processing apparatus to process data according to an exemplary embodiment. However, the inventive concept is not limited thereto.

Figure 8:
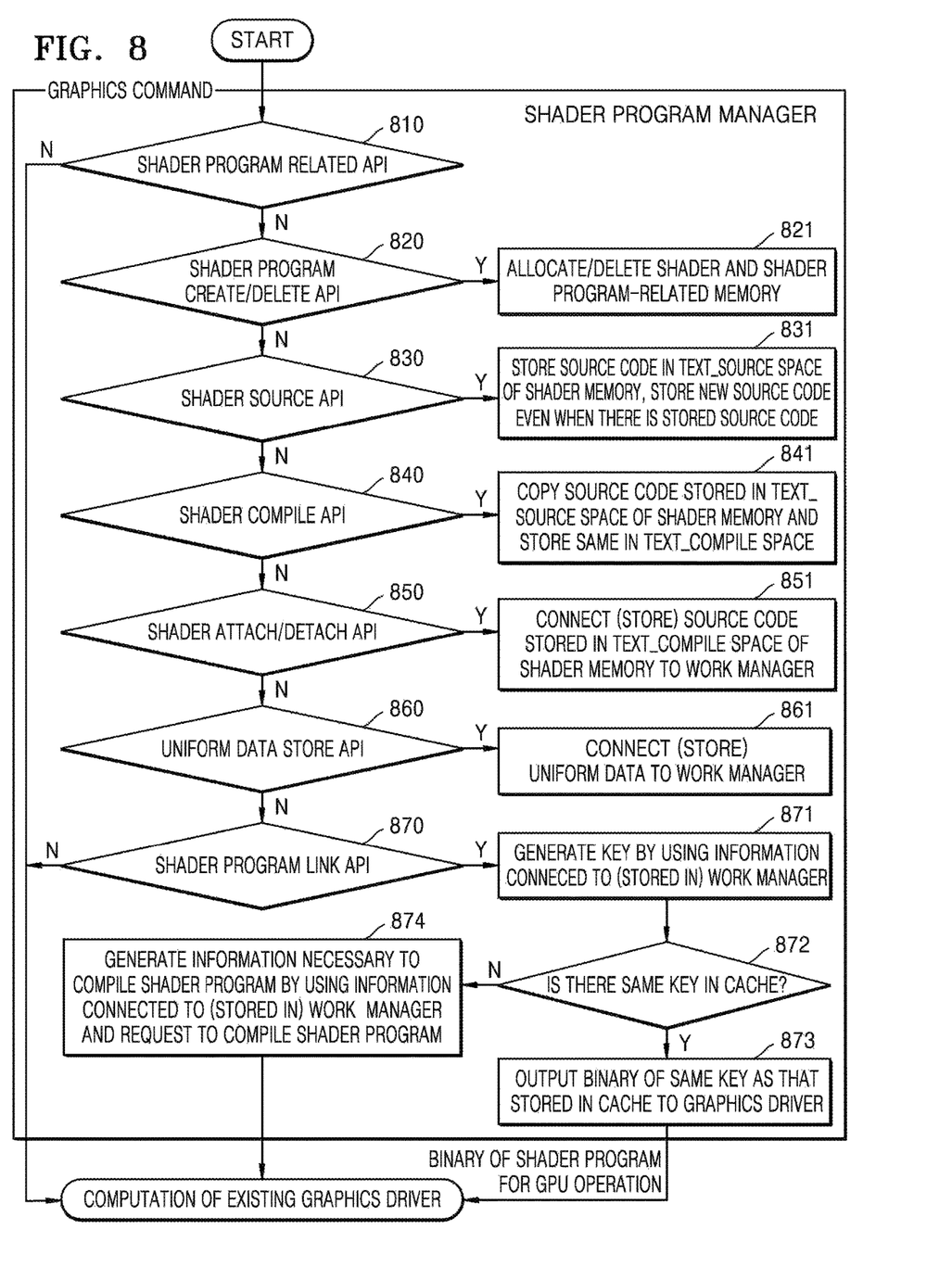
FIG. 8 is a detailed flowchart of a method of processing a graphics command, according to an exemplary embodiment.

FIG. 8 is a detailed flowchart of a method of processing a graphics command according to an exemplary embodiment.

Operations of FIG. 8 may be performed by, but not limited to, the main processor 10, the GPU 20, the shader program manager 100, and the graphics driver 200.

The following will be explained on the assumption that each operation is performed by the shader program manager 100.

The shader program manager 100 may determine whether a graphics command is received. When it is determined that the graphics command is received, the shader program manager 100 may start the method. In operation 810, the shader program manager 100 may determine whether the received graphics command is a shader program-related API.

When it is determined in operation 810 that the received graphics command is an API other than the shader program-related API, the API other than the shader program-related API may not be processed by the shader program manager 100 and may be directly output to the graphics driver 200. Computation may be performed by the graphics driver 200 on the API other than the shader program-related API output to the graphics driver 200.

Alternatively, when it is determined in operation 810 that the received graphics command is the shader program-related API, the method may proceed to operation 820.

When it is determined in operation 820 that the shader program manager 100 receives a shader program create/delete API, the method may proceed to operation 821. In operation 821, the shader program manager 100 may allocate or delete a space to or from a shader and shader program-related memory. In operation 821, the shader program manager 100 may allocate or delete a space to or from the shader memory 110 and the work memory 121.

Alternatively, when it is determined in operation 820 that the shader program manager 100 does not receive a shader program create/delete API, the method may proceed to operation 830.

When it is determined in operation 830 that the shader program manager 100 receives a shader source API, the method may proceed to operation 831. In operation 831, the shader program manager 100 may store a shader including the shader source API. The shader may be stored in the shader memory 110. A source code of the shader may be stored in a TEXT_source space of the shader memory 110. A source code of each of a vertex shader and a pixel shader may be independently stored, but not limited to, in the TEXT_source space of the shader memory 110.

Alternatively, when it is determined in operation 830 that the shader program manager 100 does not receive a shader source API, the method may proceed to operation 840.

When it is determined in operation 840 that the shader program manager 100 receives a shader compile API, the method may proceed to operation 841. In operation 841, the shader program manager 100 may store a shader. The shader may be stored in the shader memory 110. A source code (or a compile code) of the shader may be stored in the shader memory 110. The source code (or the compile code) of the shader may be stored in a TEXT_compile space of the shader memory 110. When the source code of the shader is stored, the source code stored in the TEXT_source space may be copied to and may be stored in the TEXT_compile space of the shader memory 110. The source code of each of the vertex shader and the pixel shader may be independently stored in the TEXT_compile space of the shader memory 110.

Also, in operation 841, when the source code is stored in the TEXT_source space of the shader memory 110 or the source code (or the compile code) is stored in the TEXT_compile space, a source code (or a compile code) of a shader that is received later by the shader program manager 100 may be stored in the TEXT_source space or the TEXT_compile space.

Alternatively, when it is determined in operation 840 that the shader program manager 100 does not receive a shader compile API, the method may proceed to operation 850.

When it is determined in operation 850 that the shader program manager 100 receives a shader attach/detach API, the method may proceed to operation 851. In operation 851, the shader program manager 100 may connect (or store) a shader stored in the shader memory 110 to (or in) the work manager 120. When the shader is connected to (or stored in) the work manager 120, a source code (or a compile code) stored in the TEXT_compile space may be connected to (or stored in) the work manager 120. When the shader is stored in the work manager 120, the shader program manager 100 may store the source code (or the compile code) in the work memory 121. Text of the source code (or the compile code) and a length of the text may be stored in the work memory 121. Alternatively, when it is determined in operation 850 that the shader program manager 100 does not receive a shader attach/detach API, the method may proceed to operation 860.

When it is determined in operation 860 that the shader program manager 100 receives a uniform data store API, the method may proceed to operation 861. In operation 861, the shader program manager 100 may connect (or store) uniform data to (or in) the work manager 120. When a shader is stored in the work manager 120, the shader program manager 100 may store the uniform data in the work memory 121. Text of the uniform data and a length of the text may be stored in, but not limited to, the work memory 121.

Alternatively, when it is determined in operation 860 that the shader program manager 100 does not receive a uniform data store API, the method may proceed to operation 870.

When it is determined in operation 870 that the shader program manager 100 receives a shader program link API, the method may proceed to operation 871. In operation 871, the shader program manger 100 may generate a key by using information connected to (stored in) the work manager 120. When the key is generated, the shader program manager 100 may generate a key by using information about text of at least one shader source code connected to (or stored in) the work manager 120 and a length of the text, text of uniform data and a length of the text, a compiler version, and a GPU version.

Alternatively, when it is determined in operation 870 that the shader program manager 100 does not receive a shader program link API, computation may be performed by the graphics driver 200 according to the graphics command on a received API.

When it is determined in operation 872 that the a shader program having the same key as the key generated in operation 871 is searched for and found, the method may proceed to operation 873. In operation 873, the shader program manager 100 may output the found shader program. Computation may be performed by the graphics driver 200 on the output shader program. The key of the shader program may be stored in the cache 400. The found shader program may be output as a binary.

Alternatively, when it is determined in operation 872 that a shader program having the same key as the key generated in operation 871 is not found, the method may proceed to operation 874. In operation 874, the shader program manager 100 may generate information necessary to compile a shader program by using information connected to (or stored in) the work manager 120 and may request the graphics driver 200 to compile the shader program.

Figure 9:
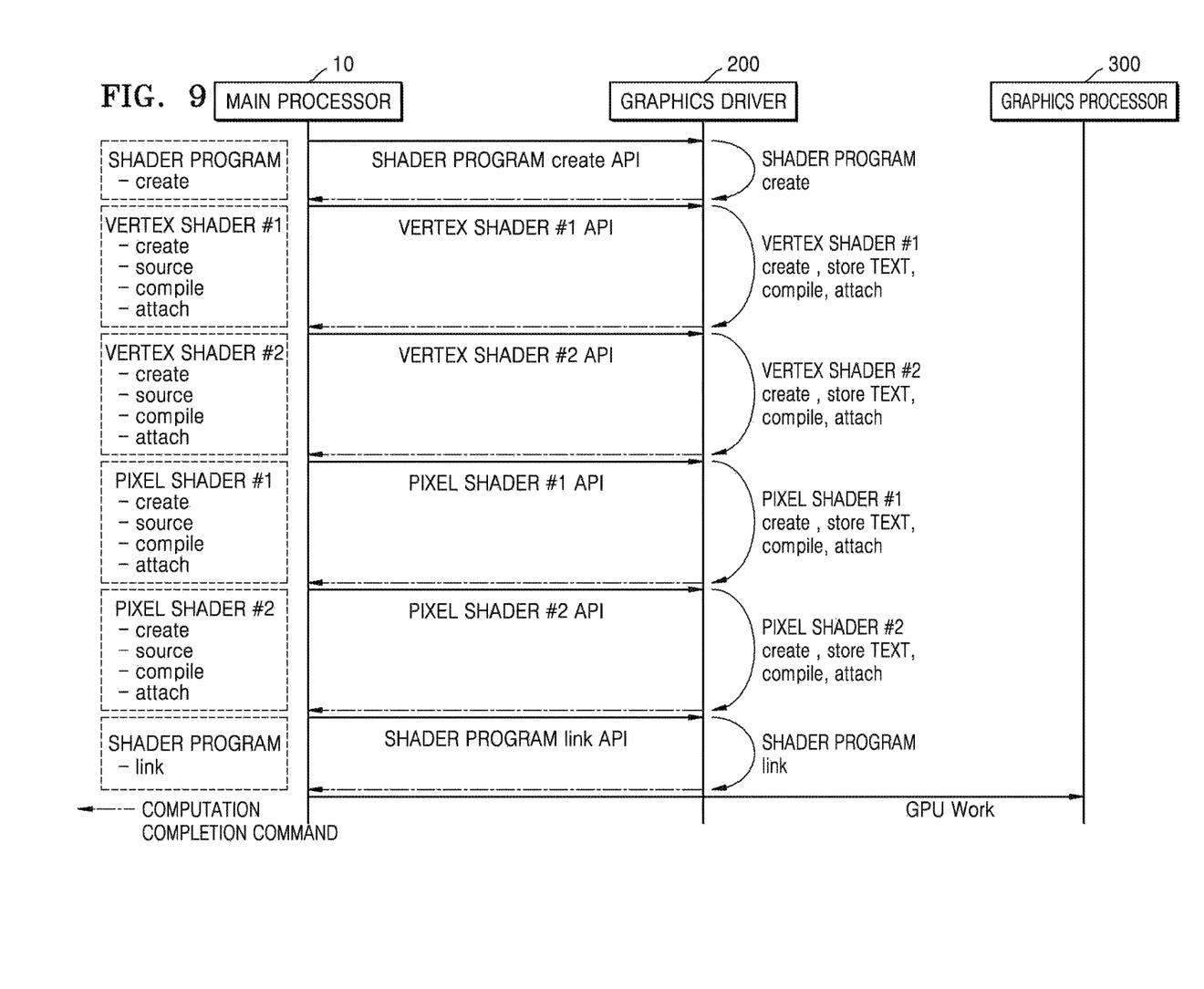
FIG. 9 is a flowchart of a method performed by a graphics driver to process a shader program-related application programming interface (API), according to an exemplary embodiment.
Figure 10:
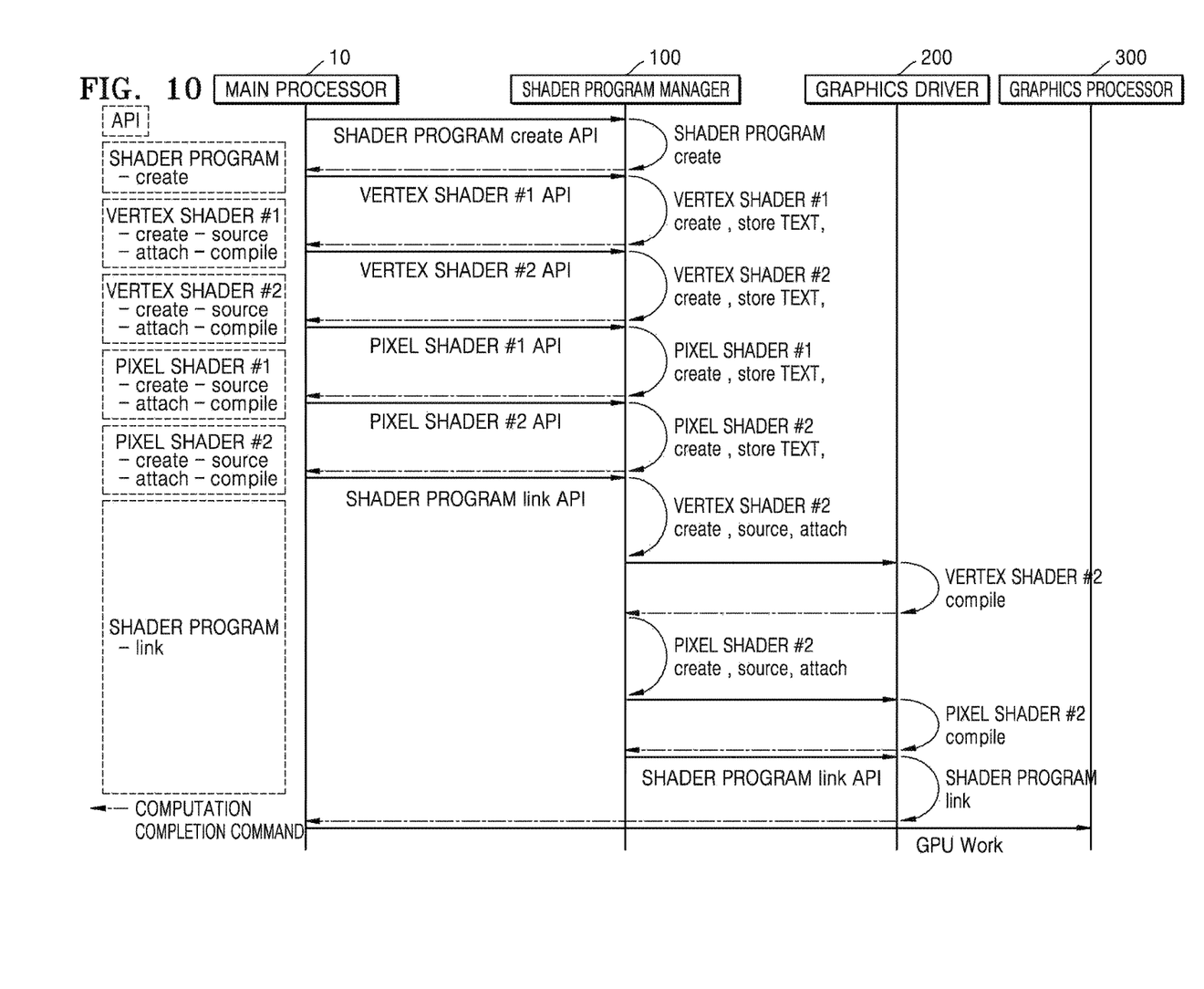
FIG. 10 is a flowchart of a method performed by the shader program manager to process a shader program-related API, according to an exemplary embodiment.

FIG. 9 is a flowchart of a method performed by the graphics driver 200 to process a shader program-related API according to an exemplary embodiment. FIG. 10 is a flowchart of a method performed by the shader program manager 100 to process a shader program-related API according to an exemplary embodiment.

FIG. 10 will now be explained by being compared with FIG. 9.

Referring to FIG. 10, when the shader program manager 100 receives at least one vertex shader and at least one pixel shader, the vertex shader and the pixel shader may be processed by the shader program manager 100 in an order in which the shaders are received.

Whenever a shader is received, the graphics driver 200 processes all APIs included in the shader in FIG. 9. However, the shader program manager 100 may process only a shader create API and a source code store API in FIG. 10. Processing of other APIs included in a shader may be deferred. The shader program manager 100 may process only the shader create API and the source code store API and may defer processing of other APIs until a shader program link API is received. However, the inventive concept is not limited thereto.

In FIG. 10, when the shader program manager 100 receives the shader program link API, an API included in each of a vertex shader and a pixel shader that are received last may be processed. The vertex shader and the pixel shader may each include a source API and a compile API. When the source API and the compile API are included in each of the vertex shader and the pixel shader, the shader program manager 100 may process an API other than the compile API. When the API other than the compile API is processed, the compile API may be processed by the graphics driver 200.

Referring to FIG. 10, when the graphics driver 200 processes the compile API, the vertex shader and the pixel shader may be complied by the compiler 500. The vertex shader and the pixel shader compiled by the compiler 500 may be a vertex shader and a pixel shader that are received last by the shader program manager 100. When the vertex shader and the pixel shader are compiled, the graphics driver 200 may create the shader program 1000b including a compiled vertex shader and a compiled pixel shader. Computation may be performed by the graphics driver 200 on the created shader program 1000b.

As described above, computation may be omitted by deferring processing of a graphics command. Also, when a shader program is re-created, the amount of computation may be reduced by omitting a process of compiling the shader program by re-using a shader program binary that is previously stored.

One or more exemplary embodiments may be embodied as a recording medium, e.g., a program module to be executed in computers, which include computer-readable commands. A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal such as a carrier wave, or another transmission mechanism, and an example thereof includes an arbitrary information transmission medium.

Also, the term "unit" used herein may refer to a hardware component such as a processor or a circuit and/or a software component executed by a hardware component such as a processor.

While the inventive concept has been particularly shown and described with reference to exemplary embodiments thereof, it will be understood by one of ordinary skill in the art that various changes in form and details may be made therein without departing from the spirit and scope of the inventive concept as defined by the following claims. Hence, it will be understood that exemplary embodiments described above are not limiting of the scope of the inventive concept. For example, each component described in a single type may be executed in a distributed manner, and components described distributed may also be executed in an integrated form.

The scope of the inventive concept is indicated by the claims rather than by the detailed description of the inventive concept, and it should be understood that the claims and all modifications or modified forms drawn from the concept of the claims are included in the scope of the inventive concept.

What is claimed is:

1. A method of processing a graphics command, the method comprising:

receiving the graphics command;

selecting at least one shader included in the graphics command to be processed by a processor;

creating a shader program using the selected at least one shader;

selecting a shader program corresponding to the created shader program from among one or more previously compiled shader programs; and outputting a selected shader program, wherein the selecting the at least one shader comprises selecting a vertex shader and a pixel shader received last among a plurality of received vertex shaders and pixel shaders, and wherein each of the vertex shader and the pixel shader comprises a corresponding source code and a corresponding compile code.

2. The method of claim 1, wherein the creating of the shader program comprises creating the shader program using the vertex shader, the pixel shader, and uniform data.

3. The method of claim 1, wherein the searching comprises:

generating a key comprising information about text of the at least one shader and a length of the text, text of uniform data and a length of the text, a compiler version, and a graphics processing unit (GPU) version; and searching for the shader program using the generated key.

4. The method of claim 1, wherein the outputting comprises outputting a binary of the found shader program.

5. A non-transitory computer-readable recording medium having embodied thereon a program, which when executed by a processor, causes the processor to execute the method of claim 1.

6. An apparatus for processing a graphics command, the apparatus comprising:

a processor configured to receive the graphics command, select at least one shader included in the graphics command to be processed by a processor, create a shader program using the selected at least one shader, select a shader program corresponding to the created shader program from among one or more previously compiled shader programs, and output a selected shader program; and a memory configured to store the one or more previously compiled shader programs, wherein the processor is configured to select a vertex shader and a pixel shader received last among a plurality of received vertex shaders and pixel shaders, and wherein each of the vertex shader and the pixel shader comprises a corresponding source code and a corresponding compile code.

7. The apparatus of claim 6, wherein the processor creates the shader program using the vertex shader, the pixel shader, and uniform data.

8. The apparatus of claim 6, wherein the processor generates a key using data comprising information about text of the at least one shader and a length of the text, text of uniform data and a length of the text, a compiler version, and a graphics processing unit (GPU) version and searches for the shader program using the generated key.

9. The apparatus of claim 6, wherein the memory stores information comprising a binary and a key corresponding to each of the one or more previously compiled shader programs.

10. The apparatus of claim 6, wherein the processor does not perform compiling in response to receiving a shader comprising a compile code.

11. A graphics processing unit (GPU) comprising:

a processor configured to receive a graphics command, select at least one shader included in the graphics command to be processed by a graphics processor, create a shader program using the selected at least one shader, select a shader program corresponding to the created shader program from among previously compiled shader programs, and output a selected shader program; and a memory configured to store the previously compiled shader programs, wherein the processor is configured to select a vertex shader and a pixel shader received last among a plurality of received vertex shaders and pixel shaders, and wherein each of the vertex shader and the pixel shader comprises a corresponding source code and a corresponding compile code.

\* \* \* \* \*